Sept. 20, 1955     J. K. KOSCHAK, JR     2,718,059
GARDENING IMPLEMENT
Filed July 8, 1954     2 Sheets-Sheet 1
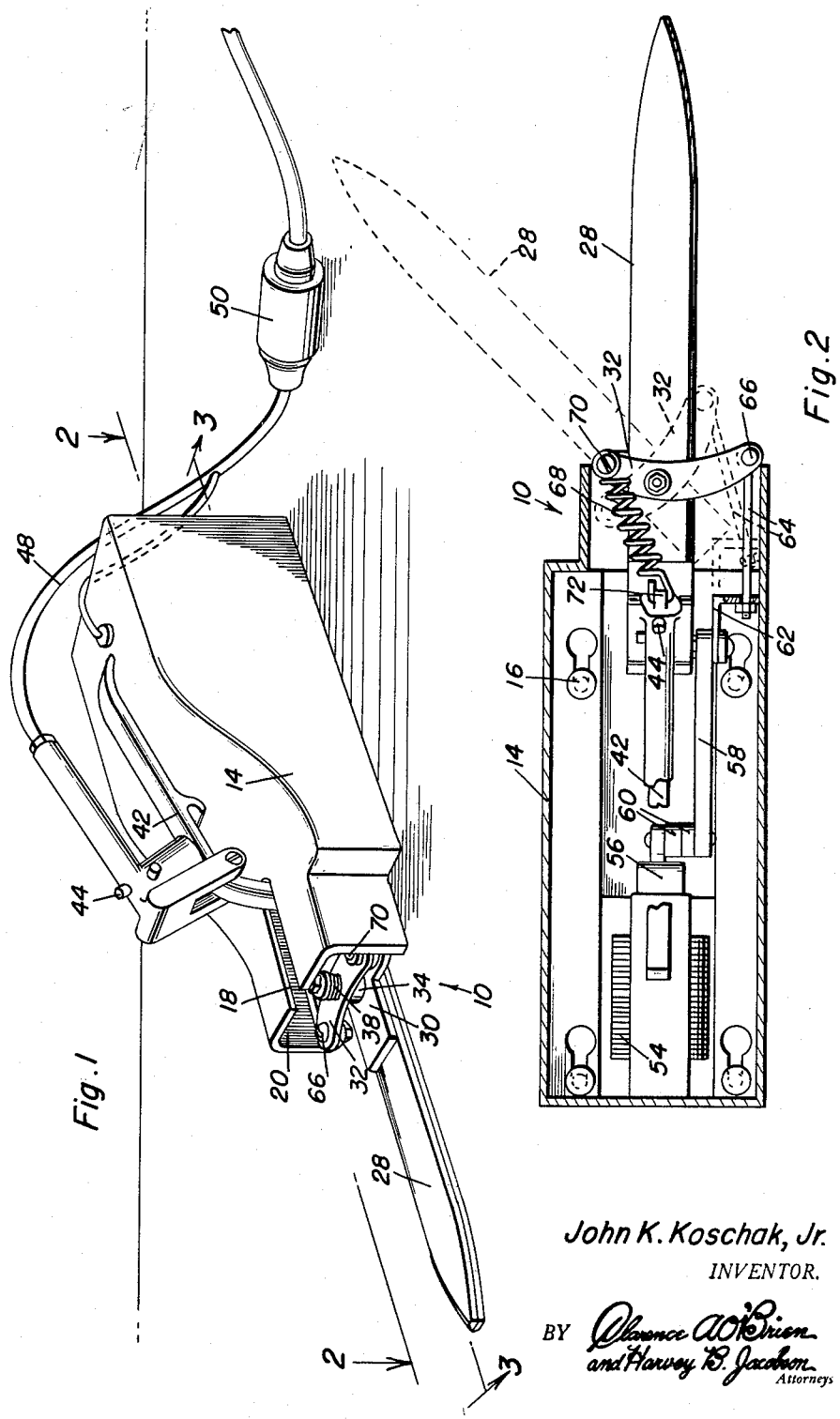
John K. Koschak, Jr.
INVENTOR.

Sept. 20, 1955 J. K. KOSCHAK, JR 2,718,059
GARDENING IMPLEMENT
Filed July 8, 1954 2 Sheets-Sheet 2
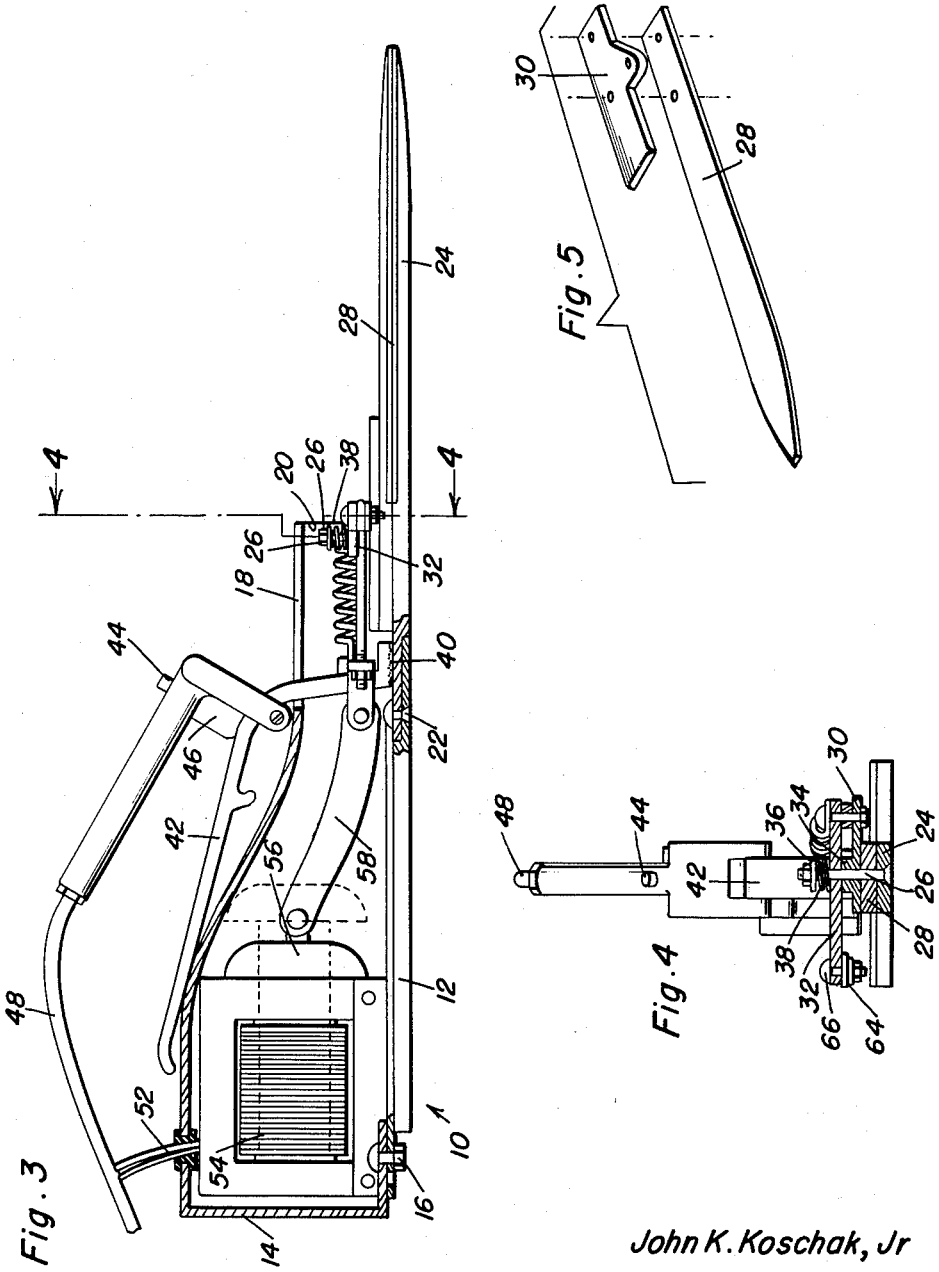
John K. Koschak, Jr
INVENTOR.

United States Patent Office 2,718,059
Patented Sept. 20, 1955

2,718,059

GARDENING IMPLEMENT

John K. Koschak, Jr., San Angelo, Tex.

Application July 8, 1954, Serial No. 441,988

3 Claims. (Cl. 30—228)

This invention relates to a gardening implement especially adapted for use in the trimming of lawns, hedges and the like.

The primary object of the present invention resides in the provision of a gardening implement having electrically actuated means for operating a moving blade in a manner so as to cooperate with a fixed blade for cutting and trimming lawns, hedges, shrubbery and the like.

The construction of this invention features a novel solenoid actuated mechanism which includes a movable blade pivotally attached to a fixed blade which itself is attached to the base of a housing. Attached to the movable blade is a crank arm which is resiliently urged into an open position and closed by action of a solenoid having circuit interrupter means for intermittently activating the solenoid.

Still further objects and features of this invention reside in the provision of an automatic electrical scissors-type hand shears to be used as grass trimmers around flower beds, house foundations, fences, walkways, driveways, curbs and the like as well as for the light pruning of vines, shrubs and hedges and the like while being comparatively simple in construction and manufacture, easy to operate, and having relatively few moving parts.

These, together with the various ancillary objects and features of the invention which will become apparent as the following description proceeds, are attained by this gardening implement, a preferred embodiment of which has been illustrated in the accompanying drawings, by way of example only, wherein:

Figure 1 is a perspective view of the gardening implement comprising the present invention;

Figure 2 is a longitudinal sectional view as taken along the plane of line 2—2 in Figure 1 and illustrating in detail the construction of the crank arm and associated elements;

Figure 3 is a vertical sectional view of the gardening implement, as taken along the plane of line 3—3 of Figure 1;

Figure 4 is a vertical sectional view as taken along the plane of line 4—4 in Figure 3 illustrating in particular the construction of the means mounting the crank arm and the movable blade; and Figure 5 is an exploded perspective view of the movable blade and mounting plate associated therewith.

With continuing reference to the accompanying drawings wherein like reference numerals designate similar parts throughout the various views, reference numeral 10 generally designates the garden implement comprising the present invention which includes a base 12 of a housing having a cover portion 14 adjustably secured thereto by means of fasteners, as at 16. The housing has a slot 18 in the forward end thereof, and is open at the front, as at 20.

Fixedly attached to the base 12 by means of suitable fasteners 22 or the like is a fixed blade 24. A pin 26 pivotally attaches a movable blade 28 to the fixed blade 24. The pin 26 extends through a mounting plate 30 as well as a crank arm 32. A spacer 34 may be positioned on the plate 30. A collar or washer 36 is provided on the pin 26 and a coil spring 38 is mounted so to engage the collar 36 and the crank arm 32.

Welded or otherwise attached to the base 12, as at 40, is an upwardly and rearwardly extending handle member 42 which extends through the slot 18 in the housing. The handle 42 carries a push-button 44 actuated switch 46 and has connected thereto a conductor 48 for connecting the gardening implement 10 to a source of electrical power.

Connected to the conductor 48 is a circuit interrupter 50 of any convenient and conventional construction which will interrupt the flow of current from the source of electrical power and thence through leads 52 to the coil 54 forming a portion of a solenoid having a core 56. The core 56 is actuated upon excitation of the coil 54, and hence a reciprocating motion is imparted to the core 56 upon the cyclic impulses of electrical energy upon the coil 54 passing from the circuit interrupter 50.

Attached to the core 56 is a link 58 which is offset to one side of the core 56 by spacers 60. The link 58 has affixed thereto a substantially L-shaped bracket 62 in which a crank rod 64 is adjustably positioned and held in place by a suitable nut, the crank rod 64 being pivotally attached, as at 66, to the crank arm 32. A coil spring 68 is terminally attached to the handle 42 and is pivotally attached, as at 70, to the crank arm 32.

The reciprocating motion of the core 56 will cause a reciprocating motion to be imparted to the movable blade 28 through the linkage formed by the link 58, the bracket 62 and the crank rod 64. The spring 68 will continuously urge the movable blade 28 to an open position ready to further cut hedges, grass or the like. Proper operation of this gardening tool can be assured by careful adjustment of the various elements thereof.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A gardening tool comprising a housing having a fixed blade rigidly secured thereto, a movable blade pivotally attached to and adapted to overlie said fixed blade, a crank arm attached to said movable blade, a spring attached to one end of said crank arm for resiliently urging said movable blade to an open position, a linkage pivotally attached to the other end of said crank arm, a solenoid in said housing, said linkage being connected to said solenoid, said solenoid being connected to a source of electrical power for actuating said solenoid to move said movable blade to a closed position, a handle secured to said fixed blade, said housing having a slot therein, said handle extending through said slot and having a portion thereof overlying said housing.

2. A gardening tool comprising a housing having a fixed blade rigidly secured thereto, a movable blade pivotally attached to and adapted to overlie said fixed blade, a crank arm attached to said movable blade, a spring attached to one end of said crank arm for resiliently urging said movable blade to an open position, a linkage pivotally attached to the other end of said crank arm, a solenoid in said housing, said linkage being connected to said solenoid, said solenoid being connected to a source of electrical power for actuating said solenoid to move said movable blade to a closed position, a handle secured to said fixed blade, said housing having a slot therein, said handle extending through said slot and having a portion thereof overlying said housing, said spring having an end thereof secured to said handle.

3. A gardening tool comprising a housing having a fixed blade rigidly secured thereto, a movable blade pivotally attached to and adapted to overlie said fixed blade, a crank arm attached to said movable blade, a spring attached to one end of said crank arm for resiliently urging said movable blade to an open position, a linkage pivotally attached to the other end of said crank arm, a solenoid in said housing, said linkage being connected to said solenoid, said solenoid being connected to a source of electrical power for actuating said solenoid to move said movable blade to a closed position, and a circuit interrupter for intermittently interrupting flow of electrical power from said source to said solenoid, a handle secured to said fixed blade, said housing having a slot therein, said handle extending through said slot and having a portion thereof overlying said housing.

References Cited in the file of this patent

UNITED STATES PATENTS

| | | |
|---|---|---|
| 779,427 | Jessop | Jan. 10, 1905 |
| 949,095 | Stephany | Feb. 15, 1910 |
| 1,280,398 | Ciolkosz | Oct. 1, 1918 |
| 1,680,627 | Mings et al. | Aug. 14, 1928 |
| 1,802,571 | Orussa | Apr. 28, 1931 |
| 2,286,552 | Klese | June 16, 1942 |